United States Patent [19]

Fischer, Jr.

[11] Patent Number: 4,967,479

[45] Date of Patent: Nov. 6, 1990

[54] POSITION RELOCATION DEVICE

[75] Inventor: Charles J. Fischer, Jr., Eagle River, Wis.

[73] Assignee: Zebco Corporation, Tulsa, Okla.

[21] Appl. No.: 280,958

[22] Filed: Dec. 7, 1988

[51] Int. Cl.$^5$ .......................... G01C 3/18; G01C 17/02
[52] U.S. Cl. ........................................ 33/276; 33/272; 356/144
[58] Field of Search ................. 33/276, 272, 277, 275, 33/278, 252, 254

[56] References Cited

U.S. PATENT DOCUMENTS

| | | |
|---|---|---|
| 387,633 | 8/1888 | Faucette ................................. 33/272 |
| 444,795 | 1/1891 | King ........................................ 33/272 |
| 735,497 | 8/1903 | Griffith . |
| 895,330 | 8/1908 | Baur . |
| 2,280,126 | 4/1942 | Metcalf . |
| 2,334,739 | 11/1943 | Zak . |
| 2,679,105 | 5/1954 | Herrick . |
| 2,681,508 | 6/1954 | Palmer . |
| 2,724,898 | 11/1955 | Douglass . |
| 3,031,764 | 5/1962 | Larson . |
| 3,111,762 | 11/1963 | Boehme . |
| 3,184,854 | 5/1965 | Grasse . |
| 3,477,131 | 10/1966 | Warth et al. . |
| 3,659,346 | 5/1972 | Te Kronnie et al. . |
| 3,758,212 | 9/1973 | Messler et al. . |
| 3,842,511 | 10/1974 | Young, Jr. . |
| 3,858,326 | 1/1975 | Hurd . |
| 3,859,731 | 1/1975 | Endo . |
| 3,876,313 | 4/1975 | Messler et al. . |
| 3,908,281 | 9/1975 | Fox . |
| 4,245,393 | 1/1981 | Zane et al. . |
| 4,281,928 | 8/1981 | Brunson ........................... 33/276 X |
| 4,383,372 | 5/1983 | Zane et al. . |

Primary Examiner—Daniel M. Yasich
Attorney, Agent, or Firm—Wood, Phillips, Mason, Recktenwald & VanSanten

[57] ABSTRACT

A relocation device has a housing, a first sight tube having a viewing opening through which a user can look to sight an object substantially along a first line of sight, a second sight tube having a viewing opening through which a user can look to sight a second object substantially along a second line of sight, and structure for mounting the first and second sight tubes to the housing so that the first and second lines of sight are at a fixed acute angle with respect to each other.

8 Claims, 1 Drawing Sheet

U.S. Patent
Nov. 6, 1990
4,967,479
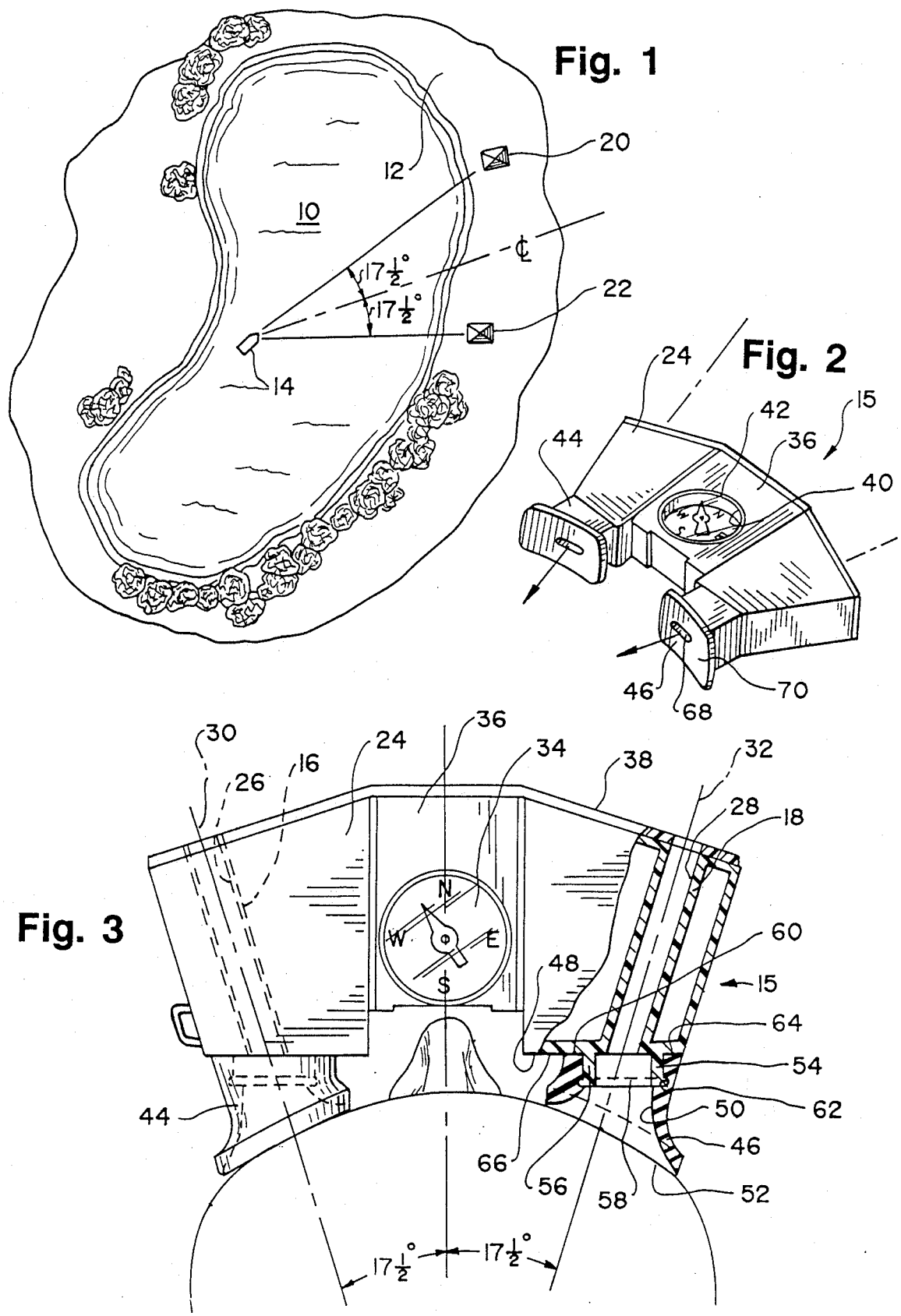

POSITION RELOCATION DEVICE

BACKGROUND OF THE INVENTION

1. Field of the Invention

This invention relates to a device for consistently relocating one's position with reference to two fixed objects.

2. Background Art

It is common for fish to school consistently in the same location, as in proximity to a submerged reef, tree, or the like. Often, the particular location will be far away from shore with nothing proximate thereto to serve as frame of reference for the fisherman to pinpoint and return to that location. In most cases, if the area of interest is small, the fisherman's attempts to relocate that area through rought visual estimating will be unsuccessful. One prior art device intended for relocation assistance is shown in U.S. Pat. No. 3,477,131, to Warth et al. In Warth et al, a device is provided with one fixed and one moveable sighting tube. A user can sight one fixed object through the fixed tube and then line the moveable tube on a second fixed object. By re-sighting the same two objects, one is able to return to the same general location.

The Warth et al structure has numerous drawbacks. First, the Warth et al device is inconvenient to use. One has to attempt to maintain the fixed tube lined up on one object and move the other tube to sight a second object. With a boat moving in rough water, this could be a very difficult procedure.

Additionally, if one desired to identify several different spots for relocation, one would have to keep a record, for each location, of the angle between the sight tubes and the two objects used as reference points. Not only is this inconvenient, but if the reset angle is off even slightly, at long range sightings, this may result in inadequate relocation. A deviation of several feet on relocation is in some instances unacceptable.

Still further, there may be a tendency to sight two objects with the sight tubes at a relatively small angle. With angles between the sight tubes of less than 30°, the effectiveness of the relocation is substantially diminished.

SUMMARY OF THE INVENTION

The present invention is specifically directed to overcoming the above enumerated problems in a novel and simple manner.

According to the invention, a relocation device is provided and has a housing, a first sight tube having a viewing opening through which a user can look to sight an object substantially along a first line of sight, a second sight tube having a viewing opening through which a user can look to sight a second object substantially along a second line of sight, and structure for mounting the first and second sight tubes to the housing so that the first and second lines of sight are at a fixed acute angle with respect to each other.

With the device, a user can sight two separate objects through the first and second sight tubes to reference his location and, by citing the same two objects, the same location can be found, time and again. Because the angle between the sight tubes is fixed, the user does not have to make any adjustments during the sighting. He need only pick the device up and scan the shoreline to locate and subsequently relocate two fixed objects.

In a preferred form, the angle between the lines of sight is approximately 35°. This angle represents a furthest extent angle of the average peripheral vision and accounts for very precise relocation.

The invention also contemplates the provision of a compass on the housing. The compass gives the user the ability to identify the general direction of the sighted objects used as reference points. In a preferred form, the compass is mounted on top of the housing between the sight tubes. The user can simply tip the housing to view the compass and thereafter tip the device back to sight the two objects once their general location has been determined through the use of the compass.

Another aspect of the invention is the provision of flexible eye pieces on the housing. The eye pieces conform to the face of a user so that the device can be used comfortably.

BRIEF DESCRIPTION OF THE DRAWINGS

FIG. 1 is a plan view showing schematically an exemplary environment in which the present invention can be utilized;

FIG. 2 is a perspective view of a relocation device according to the present invention; and FIG. 3 is an enlarged, plan view of the relocation device in FIG. 2 shown in operative position against the face of a user.

DETAILED DESCRIPTION OF THE DRAWINGS

FIG. 1 depicts an exemplary environment in which the present invention has utility and, with reference to FIG. 1, the purpose and overall operation of the inventive device can be described. FIG. 1 depicts a lake 10 and a surrounding shore 12. A boat 14 is located in the middle of the lake 10. The present invention is directed to a device 15, shown in FIGS. 2 and 3, which enables a user to sight two fixed reference points at any location on the lake 10 and subsequently re-sight the same two objects to consistently relocate the boat once it has been moved. The inventive device can also be utilized by ice fisherman and for purposes unrelated to fishing. As previously mentioned, relocation for a fisherman is desirable when, for example, the fisherman locates a school of fish. With the inventive device 15, it is possible to consistently return to the location where the fish were found.

The user looks through separate sight tubes 16, 18 on the device 15 to focus on two separate fixed objects 20, 22 on the shoreline 12. These objects could be trees, piers, houses, etc. If the boat moves from the location shown in FIG. 1, to return to that location, the user need only return to a position wherein he can re-sight the same two objects 20, 22 through the relocation device 15.

The relocation device 15 has of a housing 24 which fixedly mounts the sight tubes 16, 18. Each sight tube 16, 18 has a cylindrical inside surface 26, 28, respectively, with axes central 30, 32, respectively. The tubes 16, 18 are mounted within the housing 24 so that the axes 30, 32 make an angle of approximately 35° with each other.

The 35° angle represents the furthest extent angle of the average peripheral vision. In tests using the device 15 described herein with a 35° angle, relocation has been within 18 inches along the sighting line and 3 inches side-to-side.

To assist relocation, a compass 34 is provided on the housing 24. Preferably, the compass 34 resides between the tubes 16, 18 on an upper surface 36 of the housing 24. The device 15 is normally held by the user against the user's face, as shown in FIG. 3, to sight the reference objects 20, 22. To utilize the compass 34, the user tips the forward portion 38 of the housing upwardly until the compass 34 is in view. Once the general direction of the objects to be sighted is determined, the user can tip the front portion 38 of the housing 24 down and conveniently sight through the tubes 16, 18 to locate the objects 20, 22. In a preferred form, there is an upwardly opening recess 40 in the housing 24 to except the compass 34 so that the upper edge 42 of the compass 34 is flush with the upper surface 36 of the housing 34, thereby giving the device 15 an overall compact profile.

Eye pieces 44, 46 are provided at the rear portion 48 of the housing 24. The eye pieces 44, 46 are substantially the same and only one representative eye piece 46 will be described herein. The eye piece 46 has a through opening 50 and a curved surface 52 which is designed to be pressed against the eye area of the user. The surface 52 is made from a flexible material so that it conforms to the user's face. The eye piece 46 attaches to a rearward projection 54 on the housing 24. The projection 54 has an annular body 56 with a radially enlarged bead 58.

To assemble the eye piece 46, a forward portion 60 thereof is pressed against the bead 58 so that the bead 58 squeezes into the through opening 50. In a predetermined position, an annular recess 62 in the eye piece 46 seats the bead 58. The bead 58 seats simultaneously as the forward edge 64 of the eyepiece 46 abuts a rearwardly facing surface 66 on the housing 24. With the eyepiece 46 in place, the through opening 50 aligns with the axis 32 of the sight tube 18. A laterally elongate slit 68 is provided through a curved rear wall 70 on the eyepiece 46 to permit viewing through the eyepiece 46 and sight tube 18.

The above device can be simply manufactured with the housing 24 preferably being made from plastic so as to be light in weight. By reason of the fixed angle between the sight tube axes 30, 32, the user need not make any calculations as may be required in prior art devices to establish location. Rather, the user need only pick the device 15 up and sight two separate objects to determine the boat location. In returning to the general vicinity of the spot to be relocated, the user picks up the device 15 so that the compass 34 is visible, whereupon the user can establish the general direction of the objects 20, 22 to be sighted. Thereafter, the device 15 is tipped so that the user can look through the eyepieces 44, 46 and sight tubes 16, 18 to relocate the objects 20, 22. Once the objects 20, 22 are focused in the sight tubes 16, 18, the boat 14 is precisely relocated.

The foregoing disclosure of specific embodiments is intended to be illustrative of the broad concepts comprehended by the invention.

I claim:

1. A relocation device comprising:
a housing having a top surface, a front, a rear, and eyepieces to conform to the head of a user;
a first sight tube having a viewing opening through which a user can look to sight an object substantially along a first line of sight;
a second sight tube having a viewing opening through which a user can look to sight an object substantially along a second line of sight;
means for mounting the first and second sight tubes to the housing so that the first and second lines of sight are at a fixed acute angle with respect to each other,
whereby a user can sight a first fixed object through the first sight tube and a second fixed object through the second sight tube to identify his location and consistently return to the same location by re-sighting the same first and second fixed objects;
a compass having a dial with directions indicated thereon; and
means for mounting the compass to the top surface of the housing between the first and second sight tubes with the compass dial facing upwardly,
whereby a user can tip the rear of the housing down slightly to observe the compass dial and at the same time keep the objects to be sighted through the first and second sight tubes in view.

2. The relocation device according to claim 1 wherein the compass resides in a recess in the top surface of the housing.

3. A relocation device comprising:
a housing having eyepieces to conform to the head of a user;
a first sight tube having a viewing opening through which a user can look to sight an object substantially along a first line of sight;
a second sight tube having a viewing opening through which a user can look to sight an object substantially along a second line of sight; and
means for mounting the first and second sight tubes to the housing so that the first and second lines of sight are at a fixed acute angle with respect to each other,
whereby a user can sight a first object through the first sight tube and a second fixed object through the second sight tube to identify his location and consistently return to the same location by re-sighting the same first and second fixed objects,
wherein said acute angle is approximately 35°.

4. A relocation device comprising:
a housing having eyepieces to conform to the head of a user;
a first sight tube having a viewing opening through which a user can look to sight an object substantially along a first line of sight;
a second sight tube having a viewing opening through which a user can look to sight an object substantially along a second line of sight; and
means for mounting the first and second sight tubes to the housing so that the first and second lines of sight are at a fixed acute angle with respect to each other,
whereby a user can sight a first object through the first sight tube and a second fixed object through the second sight tube to identify his location and consistently return to the same location by re-sighting the same first and second fixed objects,
wherein first and second eyepieces are provided with each having a through opening and means are provided for attaching the first eyepiece to the housing so that the through opening in the first eyepiece aligns with the first line of sight and for attaching the second eyepiece to the housing so that the through opening in the second eyepiece aligns with the second line of sight.

5. The relocation device according to claim 4 wherein each said eyepiece has a curved surface to be placed against the face of a user and said curved surfaces are made from a deformable material that readily conforms to the contour of a user's face.

6. A relocation device comprising:
   a housing having eyepieces to conform to the head of a user;
   a first sight tube having a first cylindrical inside surface defining a viewing opening through which a user can look to sight an object substantially along the line of the axis of the cylindrical inside surface;
   a second sight tube having a second cylindrical inside surface defining a viewing opening through which a user can look to sight an object substantially along the line of the axis of the second cylindrical inside surface; and
   means for mounting the first and second sight tubes to the housing so that the axes of the first and second cylindrical surfaces are fixed and make an angle of approximately 35° with respect to each other,
   whereby a user can sight a first fixed object through the first sight tube and a second fixed object through the second sight tube to identify his location and consistently return to the same location by re-sighting the same first and second fixed objects.

7. The relocation device according to claim 6 including a compass and means for mounting the compass fixedly to the housing.

8. The relocation device according to claim 7 wherein said housing has an upper surface, there is an upwardly opening recess in the upper surface and the compass mounting means mounts the compass within the upwardly opening recess.

* * * * *